United States Patent
Zones

(10) Patent No.: US 11,708,277 B2
(45) Date of Patent: Jul. 25, 2023

(54) LOW PRESSURE SYNTHESIS OF ZEOLITE SSZ-13

(71) Applicant: CHEVRON U.S.A. INC., San Ramon, CA (US)

(72) Inventor: Stacey Ian Zones, San Francisco, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/372,660

(22) Filed: Jul. 12, 2021

(65) Prior Publication Data

US 2022/0033271 A1 Feb. 3, 2022

Related U.S. Application Data

(60) Provisional application No. 63/060,201, filed on Aug. 3, 2020.

(51) Int. Cl.
*C01B 39/48* (2006.01)

(52) U.S. Cl.
CPC .................................. *C01B 39/48* (2013.01)

(58) Field of Classification Search
None
See application file for complete search history.

(56) References Cited

U.S. PATENT DOCUMENTS

| | | | |
|---|---|---|---|
| 4,544,538 A | 10/1985 | Zones | |
| 5,275,640 A * | 1/1994 | Schroter | C01B 21/0461 95/122 |
| 8,007,764 B2 | 8/2011 | Miller et al. | |
| 2019/0240648 A1 * | 8/2019 | Yamaguchi | B01J 29/7015 |
| 2020/0010332 A1 | 1/2020 | Lang | |
| 2022/0401932 A1 * | 12/2022 | Kun | C01B 39/48 |

FOREIGN PATENT DOCUMENTS

| | | | |
|---|---|---|---|
| CA | 2013529 | * | 6/1989 |
| CA | 2013529 | * | 10/1990 |
| CN | 108751217 | * | 11/2018 |
| CN | 110342537 | * | 10/2019 |
| EP | 3670451 A1 | | 6/2020 |
| JP | 2015066532 | * | 4/2013 |
| JP | 2015066532 | * | 4/2015 |
| JP | 6167482 | * | 7/2017 |
| WO | 2011064186 | * | 6/2011 |
| WO | 2018113566 A1 | | 6/2018 |
| WO | 2019180663 A1 | | 9/2019 |

OTHER PUBLICATIONS

English translation of: 2015066532. Hasegawa Apr. 2013 (Year: 2013).*
PCT International Search Report, International Appl. No. PCT/IB2021/056228, dated Oct. 10, 2021.
S.I. Zones and R.A. Van Nordstram "Novel zeolite transformations: The emplate-mediated conversion of Cubic P zeolite to SSZ-13" Zeolites 1988, 8, 166-174.

* cited by examiner

*Primary Examiner* — Sheng H Davis

(57) ABSTRACT

A method is described for the synthesis of aluminosilicate CHA framework type molecular sieves at ambient pressure via interzeolite conversion from FAU framework type zeolites.

12 Claims, No Drawings

LOW PRESSURE SYNTHESIS OF ZEOLITE SSZ-13

CROSS-REFERENCE TO RELATED APPLICATIONS

This application claims priority to and the benefit of U.S. Provisional Application Ser. No. 62/909,609, filed Aug. 3, 2020.

FIELD

This disclosure relates to the synthesis of zeolite SSZ-13 at ambient pressure.

BACKGROUND

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three-letter code and are described in the "*Atlas of Zeolite Framework Types*" (Sixth Revised Edition, Elsevier, 2007).

Molecular sieve materials of the CHA framework type, such as zeolite SSZ-13, are characterized by three-dimensional 8-membered-ring (8MR) pore/channel systems containing double-six-rings (D6R) and cages. CHA framework type molecular sieves are known to be effective as catalysts in diverse applications such as for treating combustion exhaust gas (e.g., in control of nitrogen oxide $NO_x$ emission) and in catalytic conversion of methanol to olefins among others.

Molecular sieve materials, such as CHA, are conventionally prepared by hydrothermal synthesis in which water and reactants are heated in a closed vessel at an elevated temperature for a specified time, which causes the crystallization process to take place under autogenous pressure. Operation at high self-induced pressures requires special safety measures and costly apparatus.

Accordingly, there is a need for alternative methods for manufacturing CHA framework type molecular sieves without the harsh reaction conditions described above.

SUMMARY

In one aspect, there is provided a method of synthesizing a molecular sieve of CHA framework type, the method comprising the steps of: (1) preparing a reaction mixture comprising: (a) a source of silicon and aluminum, where the source of both silicon and aluminum is a zeolite of FAU framework type; (b) a source of an alkali or alkaline earth metal (M); (c) a CHA structure directing agent (Q); (d) a source of hydroxide ions; and (e) water; and (2) heating the reaction mixture at ambient pressure and at a temperature of from 50° C. to 90° C. until crystals of the molecular sieve are formed.

DETAILED DESCRIPTION

Definitions

The term "ambient pressure" refers to pressure in the range of from 0.9 to 1.1 bar (90 to 110 kPa).

The term "framework type" as used herein has the meaning described in the "*Atlas of Zeolite Framework Types*," by Ch. Baerlocher, L. B. McCusker and D. H. Olson (Sixth Revised Edition, Elsevier, 2007).

The term "free" or "free of" herein means that the material referenced is not added to the reaction mixture as an intentional ingredient.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

The terms "open vessel" and "open reaction vessel" are intended to encompass any vessel open to the atmosphere.

The term "$SiO_2/Al_2O_3$ molar ratio" may be abbreviated as "SAR".

Synthesis of the Molecular Sieve

A method of synthesizing a molecular sieve of CHA framework type, the method comprising the steps of: (1) preparing a reaction mixture comprising: (a) a source of silicon and aluminum, where the source of both silicon and aluminum is a zeolite of FAU framework type; (b) a source of an alkali or alkaline earth metal (M); (c) a CHA structure directing agent (Q); (d) a source of hydroxide ions; and (e) water; and (2) heating the reaction mixture at ambient pressure and at a temperature of 50° C. to 90° C. until crystals of the molecular sieve are formed.

The reaction mixture can have a composition, in terms of molar ratios, within the ranges set forth in Table 1:

TABLE 1

| Reactants | Broadest | Secondary |
| --- | --- | --- |
| $SiO_2/Al_2O_3$ | ≥20 | 30 to 100 |
| $M/SiO_2$ | 0.05 to 1.00 | 0.10 to 0.70 |
| $Q/SiO_2$ | 0.05 to 0.50 | 0.05 to 0.20 |
| $OH/SiO_2$ | 0.05 to 1.00 | 0.10 to 0.70 |
| $H_2O/SiO_2$ | 5 to 80 | 10 to 60 | wherein M is an alkali or alkaline earth metal and Q is the CHA structure directing agent.

The FAU framework type zeolite can be ammonium-form zeolites or hydrogen-form zeolites (e.g., $NH_4$-form zeolite Y, H-form zeolite Y). Examples of the FAU framework type zeolite include zeolite Y (e.g., CBV720, CBV760, CBV780, HSZ -385HUA, and HSZ-390HUA). Preferably, the FAU framework type zeolite is zeolite Y. The FAU framework type zeolite can comprise two or more zeolites. Typically, the two or more zeolites are Y zeolites having different silica-to-alumina molar ratios. The FAU framework type zeolite can have a SAR in a range of from 20 to 500 (e.g., 30 to 500, or 30 to 100). The FAU framework zeolite can also be the only silicon and aluminum source to form the CHA framework type molecular sieve.

The reaction mixture may be free of a separate source of silicon such as colloidal suspensions of silica, fumed silicas, precipitated silicas, alkali metal silicates (e.g., sodium silicate), and tetraalkyl orthosilicates (e.g., tetraethyl orthosilicate).

The alkali or alkaline earth metal (M) is typically introduced into the reaction mixture in conjunction with the source of hydroxide ions. Examples of such metals include sodium and/or potassium, and also magnesium, calcium, strontium, barium, lithium, cesium, and rubidium. As used herein, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals.

The CHA framework structure directing agent (Q) can be any agent which results in the preparation of a molecular sieve having framework type CHA. The CHA framework structure directing agent can comprise one or more of a N-alkyl -3-quinuclidinol, a N,N,N-trialkylexoaminonorbornane, a N,N,N-trimethyl-1-adamantylammonium compound, a N,N,N-trimethyl-2-adamantylammonium compound, a N,N,N-trimethylcyclohexylammonium compound, a N,N-dimethyl-3,3-dimethylpiperidinium compound, a N,N-methylethyl-3,3-dimethylpiperidinium compound, a N,N-dimethyl-2-methylpiperidinium compound, 1,3,3,6,6-pentamethyl-6-azonio-bicyclo[3.2.1]octane, N,N-dimethylcyclohexylamine, and a N,N,N-trimethylbenzylammonium compound, more preferably a hydroxide thereof, wherein more preferably, the CHA framework structure directing agent comprise one or more of a N,N,N-trimethyl-1-adamantylammonium compound, more preferably comprises, more preferably is N,N,N-trimethyl-1-adamantylammonium hydroxide. If a N,N,N-trimethyl-1-adamantylammonium compound is employed, it can be employed in combination with at least one further suitable ammonium compound such as a N,N,N-trimethylbenzylammonium (benzyltrimethylammonium) compound or a tetramethylammonium compound or a mixture of a benzyltrimethylammonium compound and a tetramethylammonium compound.

The reaction mixture may also contain seeds of a molecular sieve material, such as SSZ-13 from a previous synthesis, desirably in an amount of from 0.01 to 10,000 ppm by weight (e.g., from 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-13 over any undesired phases.

It is noted that the reaction mixture components can be supplied by more than one source. Also, two or more reaction components can be provided by one source. The reaction mixture can be prepared either batchwise or continuously.

Crystallization of the molecular sieve from the above reaction mixture can be carried out in any suitable open vessel, such as for example polypropylene jars, at a temperature of from 50° C. to 90° C. (e.g., 55° C. to 85° C., 60° C. to 80° C., 65° C. to 75° C., 50° C. to 85° C., 50° C. to 80° C., 50° C. to 75° C., 50° C. to 70° C.) for a time sufficient for crystallization to occur at the temperature used (e.g., from about 1 day to 14 days).

In some aspects, the reaction mixture may be heated under static crystallization conditions for a time sufficient to form crystals of the molecular sieve of CHA framework type. It will be appreciated that a reaction mixture is under static conditions when the reaction mixture is not agitated, for example by mechanical agitation, such as stirring. Methods of mechanical agitation include stirring the mixture within a vessel (e.g., with a paddle) and pumping the mixture from one part of a vessel to another.

Once the desired molecular sieve crystals have formed, the solid product can be separated from the reaction mixture by standard mechanical separation techniques such as centrifugation or filtration. The recovered crystals are water-washed and then dried, for several seconds to a few minutes (e.g., 5 seconds to 10 minutes for flash drying) or several hours (e.g., 4 to 24 hours for oven drying at 75° C. to 150° C.), to obtain the as-synthesized molecular sieve crystals. The drying step can be performed at atmospheric pressure or under vacuum.

As a result of the crystallization process, the recovered crystalline molecular sieve product contains within its pores at least a portion of the CHA structure directing agent used in its synthesis.

The as-synthesized molecular sieve may be subjected to thermal treatment, ozone treatment, or other treatment to remove part or all of the structure directing agent used in its synthesis. Removal of the structure directing agent may be carried out by thermal treatment (i.e., calcination) in which the as-synthesized molecular sieve is heated in air or inert gas at a temperature sufficient to remove part or all of the structure directing agent. While sub-atmospheric pressure may be used for the thermal treatment, ambient pressure is desired for reasons of convenience. The thermal treatment may be performed at a temperature at least 370° C. for at least a minute and generally not longer than 20 hours (e.g., from 1 to 12 hours). The thermal treatment can be performed at a temperature of up to 925° C. For example, the thermal treatment may be conducted at a temperature of 400° C. to 600° C. in air for approximately 1 to 8 hours.

Any extra-framework metal cations in the molecular sieve may be replaced in accordance with techniques well known in the art (e.g., by ion exchange) with other cations. Replacing cations can include metal ions, hydrogen ions, hydrogen precursor ions (e.g., ammonium ions), and combinations thereof.

Characterization of the Molecular Sieve

In its as-synthesized and anhydrous form, CHA framework type molecular sieve can have a chemical composition, in terms of molar ratios, within the ranges set forth in Table 2:

TABLE 2

|  | Broadest | Secondary |
|---|---|---|
| $SiO_2/Al_2O_3$ | ≥20 | 30 to 100 |
| $Q/SiO_2$ | >0 to 0.1 | >0 to 0.1 |
| $M/SiO_2$ | >0 to 0.1 | >0 to 0.1 | wherein Q is a CHA structure directing agent and M is an alkali or alkaline earth metal.

In some aspects, the CHA framework type molecular sieve material is SSZ-13.

As taught by U.S. Pat. No. 4,544,538, zeolite SSZ-13 has a powder X-ray diffraction pattern which, in the as-synthesized form of the zeolite, includes at least the peaks listed in Table 3 below and which, in the calcined form of the zeolite, includes at least the peaks listed in Table 4 below.

TABLE 3

Characteristic Peaks for As-Synthesized SSZ-13

| 2-Theta [°] | d-spacing [Å] | Relative Intensity [100 × I/Io] |
|---|---|---|
| 9.57 | 9.24 | 61 |
| 14.06 | 6.30 | 21 |
| 16.23 | 5.46 | 80 |
| 17.82 | 4.98 | 24 |
| 20.87 | 4.26 | 100 |
| 22.14 | 4.01 | 9 |
| 22.72 | 3.91 | 8 |
| 25.01 | 3.56 | 69 |
| 26.30 | 3.589 | 18 |

TABLE 3-continued

Characteristic Peaks for As-Synthesized SSZ-13

| 2-Theta [°] | d-spacing [Å] | Relative Intensity [100 × I/Io] |
|---|---|---|
| 31.00 | 2.885 | 47 |
| 31.29 | 2.859 | 21 |

TABLE 4

Characteristic Peaks for Calcined SSZ-13

| 2-Theta [°] | d-spacing [Å] | Relative Intensity [100 × I/Io] |
|---|---|---|
| 9.62 | 9.19 | 100 |
| 13.04 | 6.79 | 32 |
| 16.22 | 5.46 | 18 |
| 17.99 | 4.93 | 16 |
| 20.87 | 4.26 | 50 |
| 23.36 | 3.808 | 6 |
| 25.23 | 3.530 | 18 |
| 26.26 | 3.394 | 11 |
| 31.02 | 2.883 | 27 |
| 31.44 | 2.846 | 13 |

X-ray diffraction data reported herein were collected by standard techniques using copper K-alpha radiation. The diffraction data were recorded by step-scanning at 0.02 degrees two-theta, where theta is the Bragg angle, and using an effective counting time of 2 seconds for each step. The interplanar spacings, d-spacings, were calculated in Angstrom units, and the relative intensities of the lines, I/Io, is the ratio of the peak intensity to that of the intensity of the strongest line, above background.

Minor variations in the diffraction pattern values in the tables can result from variations in the organic compound used in the preparation and from variations in the silica-to-alumina mole ratio from sample to sample. Notwithstanding these minor perturbations, the basic crystal structures for the materials remain substantially unchanged.

EXAMPLES

The following illustrative examples are intended to be non-limiting.

Example 1

A 23 mL Teflon cup for a Parr reactor was charged with 200 mg of Zeolyst CBV720 Y-zeolite (SAR=30, loss-on-ignition≅20 wt. %), 0.3 mmoles of N,N,N-trimethyl-1-adamantammonium iodide, and 1.8 g of 1 N NaOH. The resulting mixture was heated at 66° C. for 5 days, without stirring. The solids were then isolated by centrifugation, washed with deionized water, and dried in an oven at 95° C.

Powder XRD analysis showed the product to be pure SSZ-13.

Example 2

Example 1 was repeated using 1.6 g of 1 N NaOH and 0.2 g of deionized water instead of 1.8 g of 1 N NaOH.

Powder XRD analysis showed the product was a mixture of SSZ-13 and FAU zeolite.

Example 3

Example 1 was repeated using 1.4 g of 1 N NaOH and 0.4 g of deionized water instead of 1.8 g of 1 N NaOH.

The recovered material was FAU zeolite as determined by powder XRD analysis.

Example 4

Example 1 was repeated but with heating at 80° C. for 16 hours.

The product was a mixture of FAU and SSZ-13, as determined by XRD analysis.

Example 5

Example 1 was repeated but with heating at 80° C. for 24 hours.

Powder XRD analysis showed the product to be SSZ-13 with a minor amount of FAU.

Example 6

Example 1 was repeated but with heating at 80° C. for 40 hours.

Powder XRD analysis showed the product to be pure SSZ-13.

Example 7

Example 1 was repeated but with heating at 80° C. for 48 hours.

Powder XRD analysis showed the product to be pure SSZ-13.

The invention claimed is:

1. A method of synthesizing an aluminosilicate molecular sieve of CHA framework, the method comprising the steps of:
   (1) preparing a reaction mixture comprising:
      (a) a source of silicon and aluminum, where the source of both silicon and aluminum is a zeolite of FAU framework;
      (b) a source of an alkali or alkaline earth metal (M);
      (c) a CHA structure directing agent (Q);
      (d) a source of hydroxide ions; and
      (e) water; and
   (2) heating the reaction mixture at ambient pressure and at a temperature of from 50° C. to 90° C. until crystals of the molecular sieve are formed, wherein step (2) is performed in an open reaction vessel;
   wherein the reaction mixture is free of a separate source of silicon.

2. The method of claim 1, wherein the reaction mixture has a composition, in terms of molar ratios, as follows:

| | |
|---|---|
| $SiO_2/Al_2O_3$ | ≥20 |
| $M/SiO_2$ | 0.05 to 1.00 |
| $Q/SiO_2$ | 0.05 to 0.50 |
| $OH/SiO_2$ | 0.05 to 1.00 |
| $H_2O/SiO_2$ | 5 to 80. |

3. The method of claim 1, wherein the reaction mixture has a composition, in terms of molar ratios, as follows:

| | |
|---|---|
| $SiO_2/Al_2O_3$ | 30 to 100 |
| $M/SiO_2$ | 0.10 to 0.70 |
| $Q/SiO_2$ | 0.05 to 0.20 |
| $OH/SiO_2$ | 0.10 to 0.70 |
| $H_2O/SiO_2$ | 10 to 60. |

4. The method of claim 1, wherein the zeolite of FAU framework is zeolite Y.

5. The method of claim 1, wherein the zeolite of FAU framework has a molar ratio of $SiO_2/Al_2O_3$ in a range of from 20 to 500.

6. The method of claim 1, wherein the zeolite of FAU framework has a molar ratio of $SiO_2/Al_2O_3$ in a range of from 30 to 100.

7. The method of claim 1, wherein the separate source of silicon is selected from the group consisting of colloidal suspensions of silica, fumed silicas, precipitated silicas, alkali metal silicates, tetraalkyl orthosilicates, and any combination thereof.

8. The method of claim 1, wherein the alkali or alkaline earth metal (M) comprises sodium.

9. The method of claim 1, wherein the CHA framework structure directing agent comprises one or more of a N-alkyl-3-quinuclidinol, a N,N,N-trialkylexoaminonorbornane, a N,N,N-trimethyl -1-adamantylammonium compound, a N,N,N-trimethyl-2-adamantyl-ammonium compound, a N,N,N-trimethylcyclohexylammonium compound, a N,N-dimethyl-3,3-dimethylpiperidinium compound, a N,N-methylethyl -3,3-dimethylpiperidinium compound, a N,N-dimethyl-2-methylpiperidinium compound, 1,3,3,6,6-pentamethyl-6-azonio-bicyclo[3.2.1]octane, N,N-dimethylcyclohexylamine, and a N,N,N-trimethylbenzyl-ammonium compound.

10. The method of claim 1, wherein the ambient pressure is in a range of from 0.9 to 1.1 bar (90 to 110 kPa).

11. The method of claim 1, wherein the temperature is in a range of from 50° C. to 75° C.

12. The method of claim 1, wherein step (2) is performed under static conditions.

* * * * *